Patented Feb. 16, 1926.

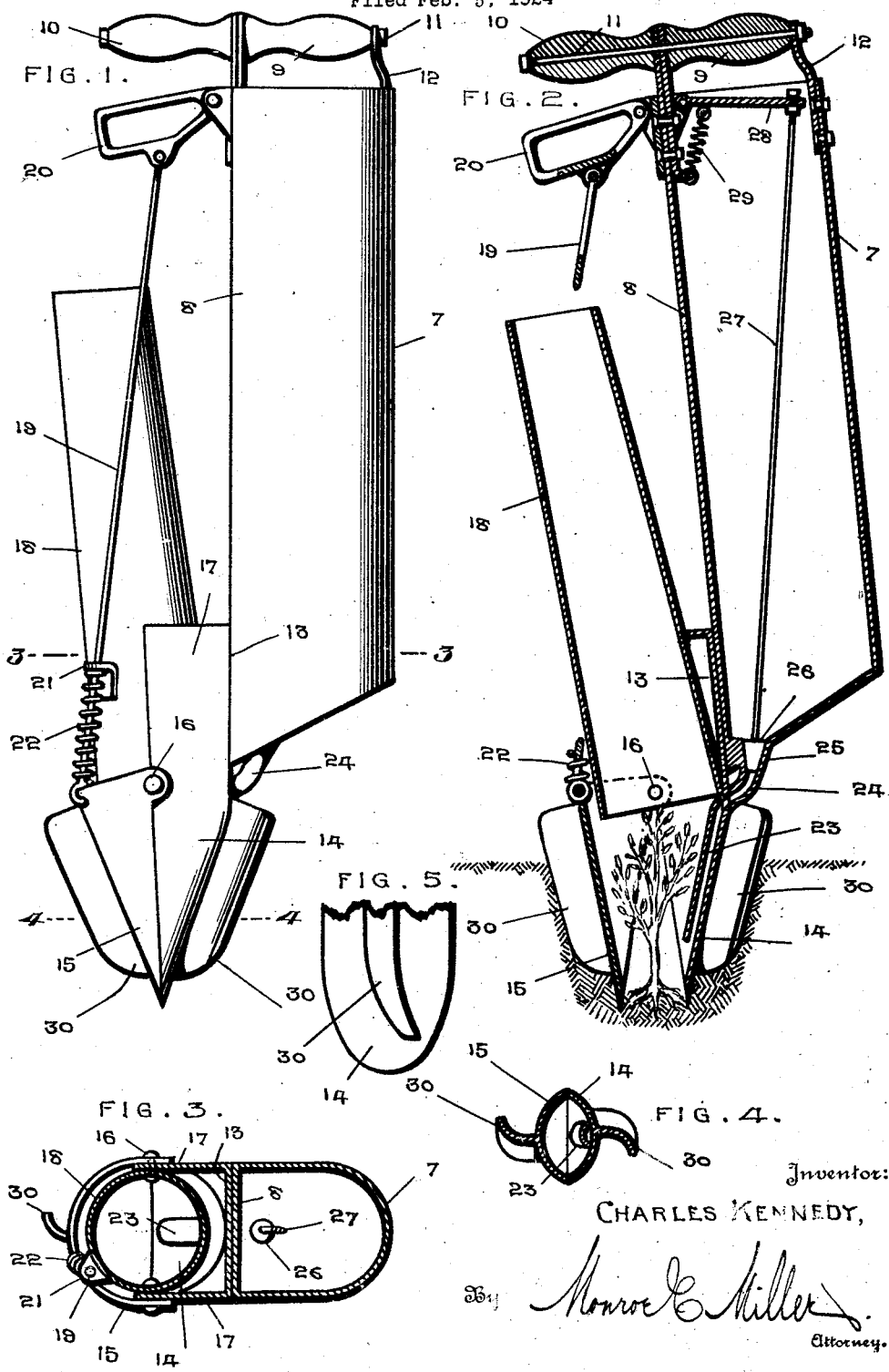

1,573,768

UNITED STATES PATENT OFFICE.

CHARLES KENNEDY, OF MAYS LICK, KENTUCKY, ASSIGNOR OF ONE-THIRD TO H. C. GALBREATH, OF BROOKSVILLE, KENTUCKY.

HAND TRANSPLANTING MACHINE.

Application filed February 5, 1924. Serial No. 690,818.

*To all whom it may concern:*

Be it known that I, CHARLES KENNEDY, a citizen of the United States, residing at Mays Lick, in the county of Mason and State of Kentucky, have invented certain new and useful Improvements in Hand Transplanting Machines; and I do hereby declare the following to be a full, clear, and exact description of the invention, such as will enable others skilled in the art to which it appertains to make and use the same.

The present invention relates to transplanters, and is an improvement over the hand transplanting machine disclosed in my copending application Serial No. 450,164, filed March 7, 1921 (now Patent No. 1,496,-647 granted June 3, 1924).

It is an object of the invention to provide a device for setting tomato, cabbage, tobacco or other plants in the ground in a simple and convenient manner, and for supplying moisture to the roots of the plants, such device being simple and substantial in construction and comprising a novel assemblage of the component elements to enhance the utility and efficiency of the device.

Another object is to construct the device chiefly from sheet metal, and to assemble the parts in a novel and substantial manner.

A further object is to provide novel means for filling in the hole made by the shovels, so as to surround the plant with dirt after being deposited in the hole.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved transplanter.

Fig. 2 is a vertical median section of the device, portions being shown in elevation.

Figs. 3 and 4 are cross sections on the respective lines 3—3 and 4—4 of Fig. 1.

Fig. 5 is a back view of one shovel showing the dirt packer thereon.

In carrying out the invention, there is provided a vertical water tank or reservoir 7, composed of sheet metal, and constituting the body or shank of the device, said tank having a flat inner side wall 8 which is extended at its upper end above the mouth of the tank for the attachment of the handles 9 and 10 disposed at opposite sides of the extension. The handle 9 is disposed above the tank and the handle 10 is located at the opposite side, and said handles are mounted on a bolt or rod 11 extending through them and through the upward extension of the wall 8. A brace 12 connects the opposite wall of the tank 7 and corresponding end of the rod 11, for bracing the handles.

A sheet metal plate 13 is soldered or otherwise secured to the wall 8 at the lower end thereof and the lower portion thereof is formed into a downwardly extending shovel or shoe 14 depending below the bottom of the tank to enter the ground. A companion shovel or shoe 15 is pivoted, as at 16, to the shovel 14 to swing open and closed, and the shovel 14 is fixed with reference to the device, while the shovel 15 is hinged to swing away from and against the shovel 14. Said shovels are of arcuate cross-section, and when closed present a sharp nose at their lower ends to enter the ground. The plate 13 has flanges 17 at opposite sides extending away from the tank, and said flanges are integral with or merged into the side portions of the shovel 14, whereby to brace said shovel.

A tubular chute 18 is disposed above the shovels, with the lower end thereof between the upper portions of the shovels, and said chute is soldered or otherwise secured to the flanges 17 between said flanges, thereby supporting the chute rigidly. The chute is inclined away from the tank 7, for the convenient dropping of the plant into the upper end of the chute. The chute also increases in diameter from its upper to its lower end so that there is no possibility of the plant catching or clinging in the chute during its descent through the chute. The chute being tapered upwardly will prevent the leaves of the plants from clinging to the sides of the chute during the descent of the plant to the ground. This is especially advantageous when the plants have large flimsy leaves, such as tobacco plants, particularly if the leaves are slightly wet or damp, so as to have a tendency to cling to the sides of the chute, thereby preventing them from falling to the proper position in the soil. With the present formation of the chute, the clinging of the plants to the sides of the chute is avoided, and the plants will drop down to the proper position in the soil.

The actuating means for the shovel 15 includes a rod 19 pivotally connected at its lower end to the upper end of the shovel 15 and pivotally connected at its upper end with a lever 20 fulcrumed to the wall 8 of the tank immediately below the handle 10, whereby the lever 20 can be raised by the hand grasping the handle 10, for swinging the shovel 15 open away from the shovel 14. The rod 19 extends along one side of the chute 18, and is guided through a guide member 21 secured to said chute, and a coiled spring 22 is disposed on the rod 19 and is confined between the guide member 21 and shovel 15 for normally swinging the shovel 15 to closed position against the shovel 14.

The water from the tank 7 is delivered to the roots of the plant, and to direct the water to the roots, a channel 23 is secured to the inner surface of the shovel 14 and extends to a point near the lower end of said shovel. A delivery tube 24 extends from the bottom of the tank 7 and is connected to the upper end portion of the shovel 14 in communication with the upper end of the channel 23 so that the water flows through the tube 24 and down the channel 23. The tube 24 has a tapered valve seat 25 at its upper end at the bottom of the tank, in which a tapered valve 26 seats for shutting off the flow of water. The valve 26 has an upwardly extending stem or rod 27 connected at its upper end with a lever 28 fulcrumed to the wall 8 of the tank immediately below the handle 9, whereby the hand which grasps the handle 9 can be used for raising the lever 28 to raise the valve 26. The valve is thus conveniently opened for the discharge of water from the tank. A spring 29 is connected to the lever 28 for normally swinging said lever downwardly and closing the valve.

The water which is delivered from the tank is discharged at the points or lower ends of the shovels or shoes, thus permitting the water to go directly into the ground after leaving the channel 23 at the roots of the plant. This avoids wetting the shovels, excepting at the tips or ends thereof, so as to avoid the leaves of the plant from sticking or clinging to the inner surfaces of the shovels, such as is the case if the shovels become wet.

In order to fill in the hole made by the shovels 14 and 15, for placing and packing dirt around the plant, outstanding wings or scoops 30 are secured to the backs or outer surfaces of the shovels 14 and 15 and extend vertically or longitudinally of the shovels midway between or intermediate the side edges of the shovels. Said wings or scoops are curved transversely, in order that when the device is rotated (clockwise as seen in Fig. 4) the scoops will draw the dirt and direct same inwardly and downwardly. The wings or scoops 30 provide dirt packers, inasmuch as the lower terminals of said wings or scoops are curved rearwardly with reference to the direction of rotation of the device, or it may be said that the lower portions of the wings or packers are of screw formation.

In using the device, the plant is dropped down through the chute 18 between the shovels, and by grasping the handles 9 and 10 the shovels are thrust into the ground. Then, by raising the lever 20, the shovels are swung apart to open position, which is preferably assisted by tilting the device, to the position as seen in Fig. 2, so that the shovels open the hole in the ground and let the plant drop out from between the shovels. The lever 28 is then raised so that water is discharged from the channel 23 to the roots of the plant, and the device is withdrawn from the ground while the shovels are open. While the device is being lifted from the ground, it is rotated, so that the wings or scoops 30 will have an auger-like action for deflecting the dirt inwardly and downwardly into the hole around the plant, so as to firmly embed the plant in the ground. The lower curved portions of the wings or packers 30 will, by cam or screw action, press the dirt downwardly, so as to compact the dirt around the clamp above the roots, it being noted that the wings or packers 30 terminate above the lower ends of the shovels, leaving the dirt somewhat loose immediately surrounding the roots of the plant. After a little practice, proficiency may be gained in manipulating the device, when withdrawing same from the ground, so that the scoops 30 will throw the dirt inwardly around the plant so as to hold the plant upright.

Having thus described the invention, what is claimed as new is:—

1. A device of the character described comprising shovels to enter the ground and to swing open, and scoops on the backs of the shovels for drawing the dirt inwardly by the rotation of the shovels in the ground, the lower portions of said scoops being curved rearwardly with reference to the direction of rotation to pack the dirt downwardly by screw action.

2. A device of the character described comprising shovels to enter the ground and to swing open, and outstanding scoops secured to the backs of the shovels and curved transversely for drawing the dirt inwardly by the rotation of the shovels in the ground, the lower terminals of said scoops being curved rearwardly with reference to the direction of rotation to pack the dirt downwardly by screw action.

In testimony whereof I have signed my name to this specification.

CHARLES KENNEDY.